United States Patent Office 3,167,065
Patented Jan. 26, 1965

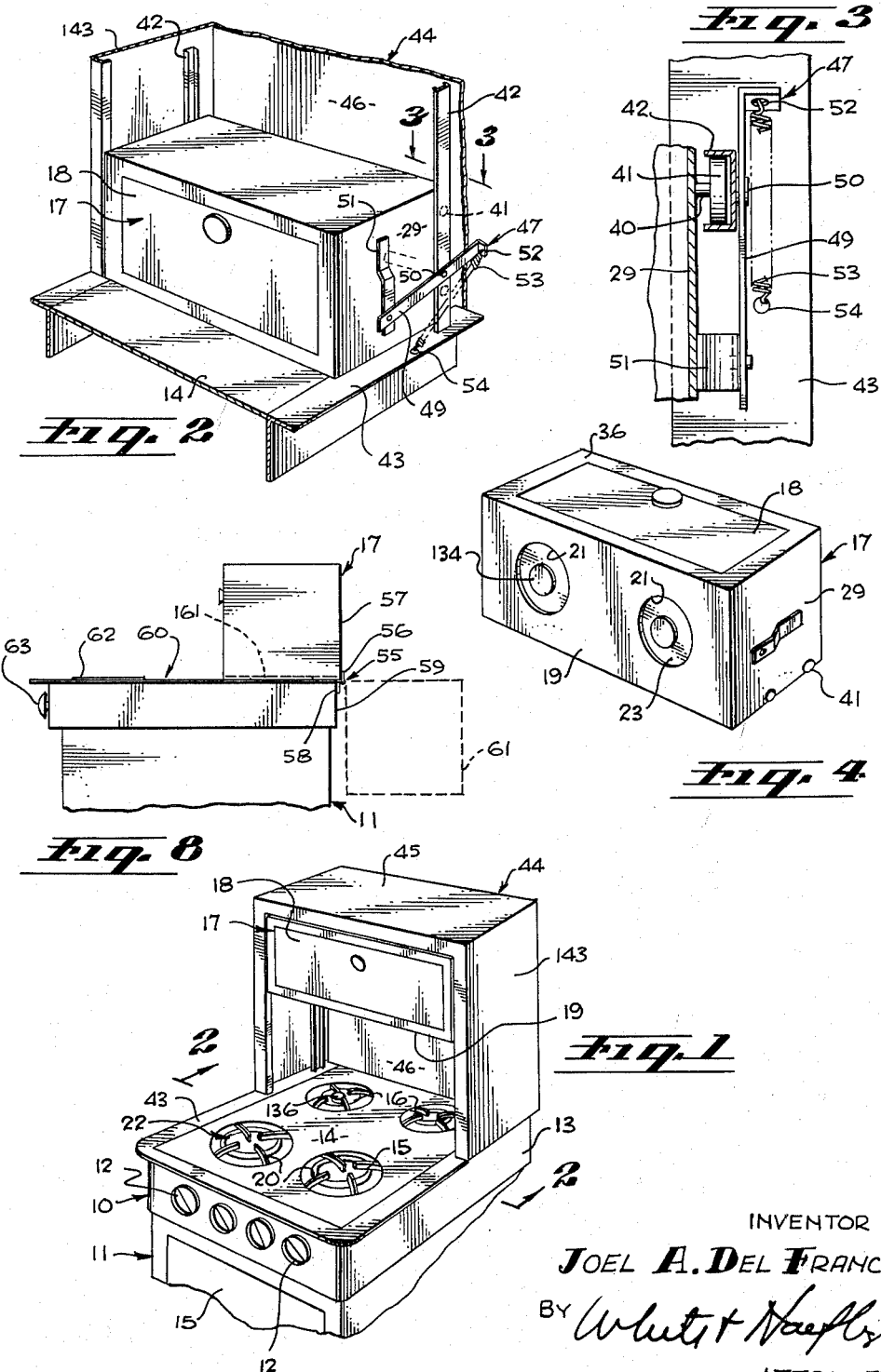

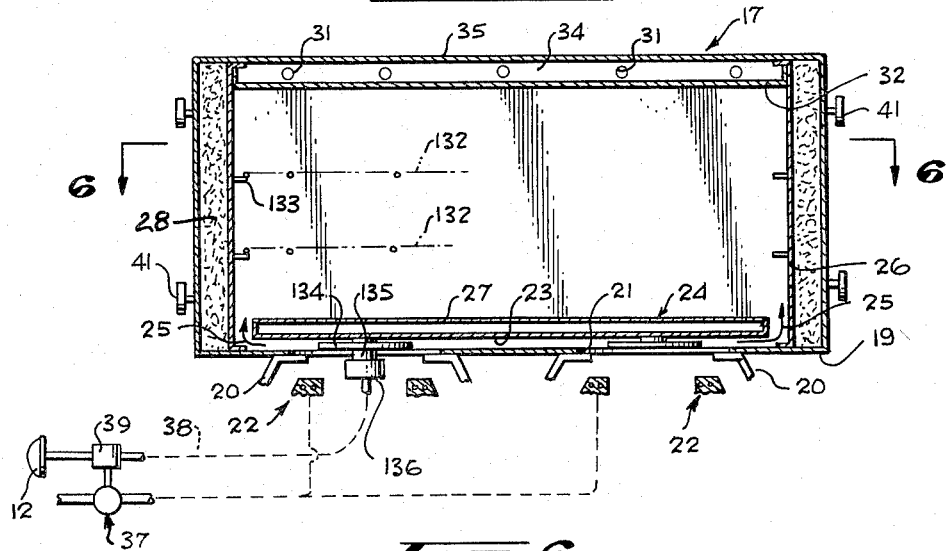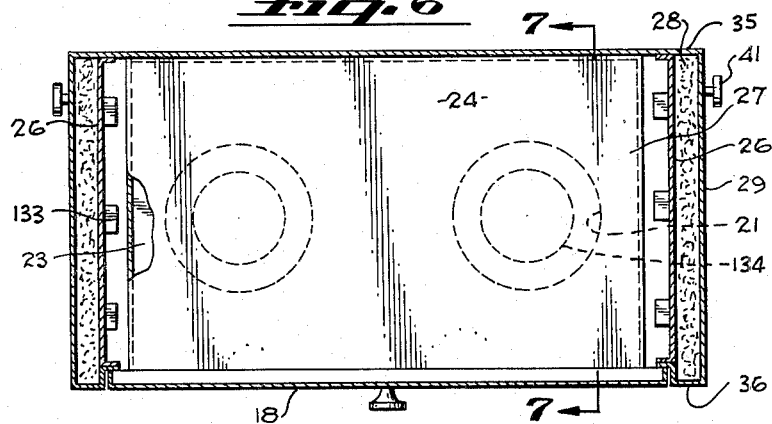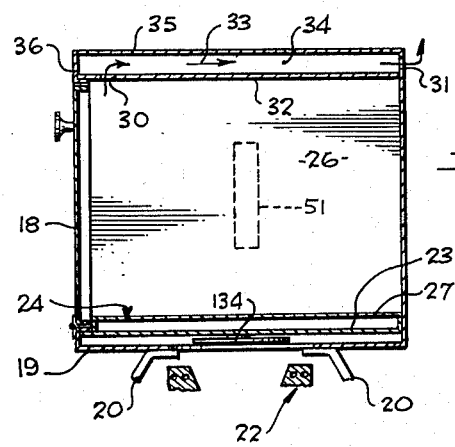

3,167,065
COMBINATION COOK STOVE AND
RETRACTABLE OVEN
Joel A. Del Francia, Alhambra, Calif., assignor to Institutional Food Equipment Corp., Huntington Park, Calif., a corporation of California
Filed Sept. 17, 1962, Ser. No. 224,893
8 Claims. (Cl. 126—19)

This invention relates generally to food cooking and storage apparatus, and more particularly concerns a unique combination cook stove, oven unit, and refrigerated food storage chamber, the elements of which are arranged to co-operate in such a manner that maximum utility of limited space is achieved.

The invention has particular application in commonly used automobile drawn trailers and camper bodies wherein space is at a premium. In the past, trailer and camper cook stoves have been built to incorporate burners or electrical heating elements exposed at the top of a stove table unit, which in turn may be supported by a refrigerator. While this arrangement offers space saving advantages, it lacks an oven unit and therefore has practical disadvantages from the standpoint of the user or owner.

It is a major object of the present invention, therefore, to solve this problem by providing a refrigerated storage chamber, a cook stove, and an oven which in combination co-operates in a novel and unique manner, and at the same time causes no increase in the floor space occupied by the cook stove table unit itself. More particularly, it is an object to provide an oven which utilizes the heating units of the cook stove as a heat source for baking purposes, and which can be readily moved to an inoperative position away from said heating units when not in use.

Another object is to provide a novel oven and cook stove combination in which the oven can also serve as a warming chamber when not being used for baking purposes. More particularly, it is an object to provide an oven member which can be moved to a warming position above the heating units, in which position it will receive heat from the heating units when they are being used for cooking and frying purposes. Specifically, it is an object to provide such a combination which includes means for confining the heat in the space between the heating units and the oven member when the latter is in the raised or warming position.

Yet another object is to provide a novel retractable oven construction which includes means for circulating hot gas adjacent the inner walls of the oven chamber. More particularly, it is an object to provide a novel oven member which includes inlet openings at the bottom thereof which overlie the heating units so as to admit hot gas to the interior of the oven, outlet openings adjacent the top of the oven, and baffle means within the oven for directing the flow of hot gas from the inlets to the outlets along the inner side walls and front wall of the oven.

An additional object is to provide automatic control means whereby the temperature in the oven, which extends over a plurality of burners or heating units when it is in an operative or baking position, can be controlled by a single heat responsive element at one of the heating units.

Further objects and advantages will be apparent from the following detailed description, reference being had to the accompanying drawings wherein preferred embodiments of the present invention are shown.

In accordance with the invention, the cook stove is mounted on a refrigerated storage cabinet and includes burner units which are adapted to be upwardly exposed for producing heat beneath cooking receptacles placed over or upon the heating units. Combined with the cook stove is an oven chamber which is mounted for relative movement between a first or warming position in which the oven chamber is spaced from the heating unit, and a second or baking position in which the heating unit is covered by the oven chamber and extends in direct heating relation with the latter. As will be seen, this combination permits the cook stove heating units to be operated for normal cooking or frying when the oven chamber is moved away from the heating unit or units. Also, the oven chamber may be moved directly over one or more of the heating units so that the latter co-operate with the oven to supply heat to the oven interior, and at the same time one or more additional heating units remain exposed directly at the front of the oven chamber for normal cook stove use.

In one form of the invention, the oven chamber has a first position in which it is vertically spaced sufficiently above a rearward burner unit to permit the latter to be used in the normal manner for cooking or frying. From that position the oven chamber can be lowered onto the rearward heating unit or units for oven cooking purposes, and it will be seen that the oven chamber and its mounting apparatus does not occupy any greater vertically projected floor space than the cook stove table unit. In another form of the invention, the oven chamber is mounted to swing about a pivot into retracted position behind the cook stove table unit, when the chamber is not in use and it is desired to use the rear cook stove burner unit or units for frying or pan cooking.

In the drawings:

FIG. 1 is a fragmentary perspective view of one form of the invention, illustrating the cook stove table unit mounted on a refrigerator box, the oven chamber being mounted on the cook stove and shown in the warming position;

FIG. 2 is a sectional view taken on the line 2—2 of FIG. 1, a portion of the enclosure being removed to show the details of the oven chamber mounting means;

FIG. 3 is an enlarged, fragmentary, sectional view taken on the line 3—3 of FIG. 2;

FIG. 4 is a perspective view of the oven chamber rotated through 90° relative to the position of FIG. 2;

FIG. 5 is a vertical sectional view taken through the oven chamber as it appears when seated upon a pair of gas burners;

FIG. 6 is a sectional view taken on the line 6—6 of FIG. 5;

FIG. 7 is a sectional view taken on the line 7—7 of FIG. 6; and

FIG. 8 is a fragmentary side elevational view of a modified form of the invention.

Referring to FIG. 1, the cook stove is indicated generally at 10, as supported upon a refrigerator unit 11, having a door 15. The cook stove incorporates a rectangular housing 13 supporting a top plate 14 within which front burners 15 and rear burners 16 are located. The four controls for these four burners are illustrated at 12. While gas burner units are illustrated in most of the figures, it will be understood that the invention is equally applicable to cook stoves having electric burner units, or heating elements provided with suitable controls.

Vertically spaced above the rearward units 16 is an oven member or chamber 17 which is better shown in FIG. 2 as having a front closure 18 adapted to be pulled outwardly for inserting articles to be warmed or oven cooked or baked. In the position shown in FIG. 1, the oven chamber 17 is sufficiently spaced above the rear burners 16 so that the chamber merely acts as a food warming device by virtue of the heat impingement upon the underside 19 of the chamber from said burners. In the position shown in FIG. 2, the oven chamber is supported directly upon the rear burner units to co-operate therewith for baking purposes.

Such co-operation between the oven member and the rear burners is better illustrated in FIG. 5 wherein the bottom panel 19 of the oven chamber 17 is shown as seated upon spiders 20, with openings 21 in the panel 19 directly over the gas burner units 22. Hot gases flow upwardly into the oven chamber 17 through openings 21, and impinge directly upon the bottom panel 23 of an inner baffle unit 24 which is spaced above the bottom panel 19 of the oven chamber and which extends from the front closure 18 to the rear wall 35. The gases are deflected as indicated by the arrows 25 to flow around the ends or side edges of the inner baffle unit 24 and then upwardly between the periphery thereof and the interior side panels 26 of the oven chamber to heat the chamber interior to a desired temperature. The baffle unit 24 also incorporates an upper panel 27 which is slightly spaced above the lower panel 23, it being desired that receptacles placed in the oven and upon the upper panel 27 be out of contact with the much warmer baffle lower panel 23.

The oven chamber is insulated as indicated at 28 between the interior side panels 26 and the outside panels 29. As best seen in FIG. 7, gases escape from the oven chamber through upper vents 30 and 31, the first being provided near the front of the oven chamber in a top interior panel 32. Gases vented at 30 then flow rearwardly as indicated by the arrows 33 to escape from the second or rearward vents 31, a gas flow space being indicated at 34 between the top interior panel 32 and the top outer panel 35. This arrangement of the vents serves to draw hot gas or air around the side edges of the baffle unit 24 and thence forwardly toward the front of the oven chamber and thereby minimize drafts tending to enter the chamber through the clearance between the periphery of the closure 18 and the front wall 36 of the oven chamber. The numerals 132 in FIG. 5 indicate racks which are removably supported within the oven chamber by side projections shown at 133.

Attached to the lower panel 23 of the baffle assembly 24 are one or more metal plates 134 which are openly exposed through the openings 21 directly above the burner units 22 when the oven is in the baking position. The function of one of these plates is to transmit heat by conduction to a plunger 135 which is adapted to be depressed into a housing 136 centered in one burner unit, with the plate 134 forcibly contacting the top surface of the plunger 135. Within the plunger or housing 136 is a thermostatic control, not shown, which operates to control the gas supply valve 37 to the two rear burners in the case of a gas cook stove, or a rheostat in the case of an electric cook stove. This type of control system is incorporated in cook stoves to co-operate with pans or receptacles placed upon the burner units. The broken line 38 indicates the control line extending between the housing 136 and the actuator 39 which operates the supply valve 37. For example, the line 38 may contain fluid, the pressure of which increases or decreases with temperature changes and which is operable upon a diaphragm in the actuator 39 to cause turning of control valve 37. As a result, the temperature in the oven may be kept within a very close, predetermined range responsive to the temperature at one burner even though the oven extends over two burners. One of the manual controls 12 shown at FIG. 1 is also indicated in FIG. 5 as controlling the setting of the actuator 39 for preselecting the temperature range of the oven.

Referring now to FIG. 3, the end panels 29 of the oven chamber are shown as mounting spindles 40, which in turn support vertically spaced rollers 41. These are received within vertical ways or tracks 42 for guiding vertical movement of the oven chamber. The ways 42 are in turn supported on flanges 43 of the cook stove housing in the construction shown, and they are also attached to the inside surfaces of vertically extending, opposed, side panels 143 of the baffle member or enclosure 44 which extends upwardly to the oven member when the latter is in the warming position. Preferably, the side panels extend forwardly to at least the front extremities of the rear burners 16 and preferably to the front closure 18 of the oven for a maximum heating of the oven in the warming position, as will be described more fully hereafter. The enclosure 44 may also include a full top panel 45 as shown (FIG. 1) or merely a short top flange (not shown), and includes a vertically extending rear panel 46, the rear panel 46 being adjacent the rear edge of the cook stove and the side panels 143 being adjacent the side edges thereof so as to partially enclose the rear portion of the stove where the rear burners 16 are located. Although it is not necessary to have even the aforementioned short top flange, the latter may be used to engage the top of the oven chamber when it is in the upper position and thereby aid in confining the hot gas adjacent the rear of the oven. Accordingly, when the oven member or chamber 17 is in the raised or warming position, the hot gas from the rear burners is confined in the space between the rear burners 16 and the bottom wall 19 of the oven so as to heat the oven chamber and cause it to function as a so-called warming oven.

As shown in FIG. 2, the rear panel 46 is preferably spaced rearwardly of the oven chamber when the latter is in the baking position so that the hot gas can escape from the oven through the outlets 31. However, if desired, the outlets 31 could be provided in the top outer panel 35.

In the preferred construction the baffle or enclosure 44 is mounted on the cook stove housing 13 but it can also be free standing and supported on the floor of the trailer or camper or mounted on the wall thereof. In like manner, it could also be mounted on the refrigerator unit 11 with a slip-in cook stove.

The weight of the oven chamber is supported or counter-balanced at opposite ends thereof by thrust exerting means generally indicated at 47, the operation of which tends to hold the oven chamber at any desired elevation relative to the rear burners 16. The means 47 at each end of the chamber is shown typically to include a lever arm 49 pivoted at 50 to the track or way 42. The forward end of the lever arm 49 is pivotally attached to a bracket 51 secured to the end panel 29 of the oven chamber, whereas the opposite or rearward end of the lever arm is attached at 52 to one end of a tension spring 53. The opposite end of the latter is attached at 54 to the flange 43, and tends to rotate the lever arm 49 clockwise as best seen in FIG. 2. Such thrust exertion by the springs 53 at opposite ends of the oven chamber balances the weight of the oven chamber exerted upon the lever arms 49 tending to rotate them counterclockwise. Accordingly, the operator or user of the equipment does not have to lift the bulk of the weight of the oven chamber, and it is only necessary to exert sufficient force to overcome friction in the system, particularly between the rollers 41 and the tracks 42, to move the oven chamber between different vertical positions. Furthermore, the proportions and arrangement of the spring and lever system are such that an over-center action is achieved, by which the spring force acting through the lever upwardly on the oven chamber substantially exceeds the oven weight in the upper position, so that the chamber tends to stay in said upper position even when filled with food to be warmed. On the other hand, the weight of the chamber in the lower position substantially exceeds the spring force acting through the lever upwardly on the oven, so that the oven chamber tends to stay in said lower position once it is physically moved there.

Referring now to FIG. 8, an alternate arrangement for supporting the oven chamber 17 is illustrated. In this alternate construction the support for the oven comprises a hinge 55, one flange 56 of which is attached to the rear wall or panel 57 of the oven chamber and the other flange 58 of which is attached to the rear panel 59 of the cook stove 60. The oven chamber 17 is completely exposed, without any enclosure means such as was discussed in connection with FIGS. 2 and 3. When it is desired to use the cook stove 60 without the oven chamber, the latter is swung to the position shown in broken lines at 61 and the cook stove support, as for example the refrigerator 11, may be moved away from a wall where it would normally be positioned to leave room at the rear of the cook stove for the retracted oven chamber. Alternatively, when it is desired to operate the oven chamber, it is swung to the position shown in full lines in FIG. 8 wherein the electric burner units 161 at the rear of the cook stove co-operate with the oven chamber to heat the interior thereof in the manner discussed previously in connection with FIG. 5. The electric burner units at the front of the cook stove 60 are shown at 62, and controls for all of the burners are generally indicated at 63. This alternate construction is not as versatile as the preferred construction because the oven chamber cannot be used as a warming oven when it is in the so-called inoperative position.

Thus, it will be apparent that there has been produced a novel combination cook stove and retractable oven which fulfills all of the objects and advantages sought therefor. The preferred assembly of the oven chamber and its baffle or enclosure type supporting means can be supplied for attachment to existing cook stoves or cook stove-refrigerator combinations, it can be made free standing and supported on a floor or against a wall, or it can be manufactured as an integral part of the cook stove or stove-refrigerator combination. However, regardless of the manner in which said assembly is supported, it provides a baking oven and a warming oven with no increase in the amount of floor space required for the cook stove alone and without requiring a separate heat source.

In addition, the rear panel 46 of the supporting member 44, or the rear panel 46 together with the side panels 143, confine the heat or hot gas from the rear burners 16 in the space between said burners and the oven chamber 17 when it is in the upper position whereby it functions as a warming oven.

Furthermore, by using a single automatic control valve with both rear burners, the temperature of the oven chamber can be controlled by means of a heat sensing device at only one burner.

Also, the vents in the bottom wall and upper portion of the oven chamber and the baffle means within the chamber which cause the hot gas to flow through the chamber along the inner side walls and thence toward the front closure member provide an extremely efficient heat transfer when the oven chamber is in the lowermost position.

This is a continuation-in-part of application Serial No. 24,499, filed April 25, 1960, now abandoned.

It is to be understood that the foregoing description and accompanying drawings have been given only by way of illustration and example and that changes and alterations in the present disclosure which will be readily apparent to one skilled in the art are contemplated as within the scope of the present invention.

I claim:
1. The combination of:
   a cook stove having a rear portion and including an upwardly facing heating unit for producing heat beneath a cooking receptacle placed thereover;
   an oven member movable between a lower baking position in which it is in overlying proximity with the heating unit and an upper warming position in which it is spaced above the heating unit,
      said oven member having a food entrance accessible in both the baking position and the warming position;
   means mounting the oven member for movement between the baking position and the warming position; and
   a baffle member positioned in close proximity with the rear portion of the cook stove and extending upwardly therefrom to the oven member when it is in the warming position to confine hot gas in a space formed between the heating unit and the underside of the oven member when the latter is in the warming position,
      said baffle member providing unrestricted access to the food entrance of the oven member in both the warming and baking positions thereof.
2. The combination of:
   a cook stove having a rear portion with a rear edge and opposed side edges and including an upwardly facing heating unit for producing heat beneath a cooking receptacle placed thereover,
      said heating unit being contained in the rear portion of the cook stove;
   an oven member movable between a lower baking position in which it is in overlying proximity with the heating unit and an upper warming position in which it is spaced above the heating unit,
      said oven member having a food entrance accessible in both the baking position and the warming position;
   means mounting the oven member for movement between the baking position and the warming position; and
   an enclosure member positioned in close proximity with the rear portion of the cook stove and extending upwardly therefrom to confine hot gas in a space formed between the heating unit and the oven member when the latter is in the warming position,
      said enclosure having a front opening in substantially the same vertical plane as the food entrance.
3. The combination set forth in claim 2 in which the enclosure member is mounted on the cook stove.
4. The combination set forth in claim 2 in which the enclosure member is mounted on the cook stove and the means mounting the oven member for movement between the baking position and the warming position are supported on the enclosure.
5. The combination set forth in claim 2 in which said mounting means includes vertical tracks carried by one of said oven member and enclosure member and track followers carried by the other of said oven member and enclosure member.
6. The combination set forth in claim 2 in which the enclosure includes side members adjacent the side edges of the cook stove which extend at least as far forward as the front extremities of said heating unit contained in the rear portion of the cook stove.
7. The combination set forth in claim 1 in which the oven member includes a bottom inlet for hot gas remaining vertically above the heating unit when the oven member is in the baking position; and
   control means operable in response to oven member movement to said baking position for controlling the heat output of the heating unit to maintain the temperature in the oven member within a predetermined range,
      said control means including a heat-receiving body carried by the oven member proximate said bottom inlet to be heated during operation of said heating unit, and a heat responsive element adjacent the top of the heating unit contacting said body when the oven member is in the baking position for receiving heat by conduction from said body.
8. The combination of:
   a cook stove including two upwardly facing heating units for producing heat beneath a cooking receptacle placed thereover;

a heat responsive element adjacent the top of one of said heating units for automatically controlling the heat output of both of said heating units;

an oven member including a bottom wall movable between an operative baking position in which it is in overlying proximity with both of said heating units and an inoperative position in which it is spaced away from the heating units;

inlet openings in the bottom wall of the oven member in registry with the heating units when the oven member is in the operative position for admitting hot gas to the interior thereof; and a heat-receiving body carried by the oven member in heat-conducting communication with the interior thereof, said heat-receiving body being proximate the inlet which is in registry with the heating unit containing the heat-responsive element so that said heat-responsive element and the heat-receiving body are in heat-conducting engagement when the oven member is in the operative position, whereby the output of both of said heating units is controlled to maintain the temperature in the oven member within a predetermined range.

References Cited in the file of this patent

UNITED STATES PATENTS

| | | |
|---|---|---|
| 706,503 | Van Wie | Aug. 5, 1902 |
| 2,060,339 | Normand | Nov. 10, 1935 |
| 3,051,157 | Rice | Aug. 28, 1962 |

FOREIGN PATENTS

| | | |
|---|---|---|
| 617,016 | France | Nov. 8, 1926 |